July 14, 1953
A. J. FAUSEK ET AL
2,645,103
APPARATUS FOR SEPARATING THE CONSTITUENTS
OF GASEOUS MIXTURES
Filed May 2, 1949
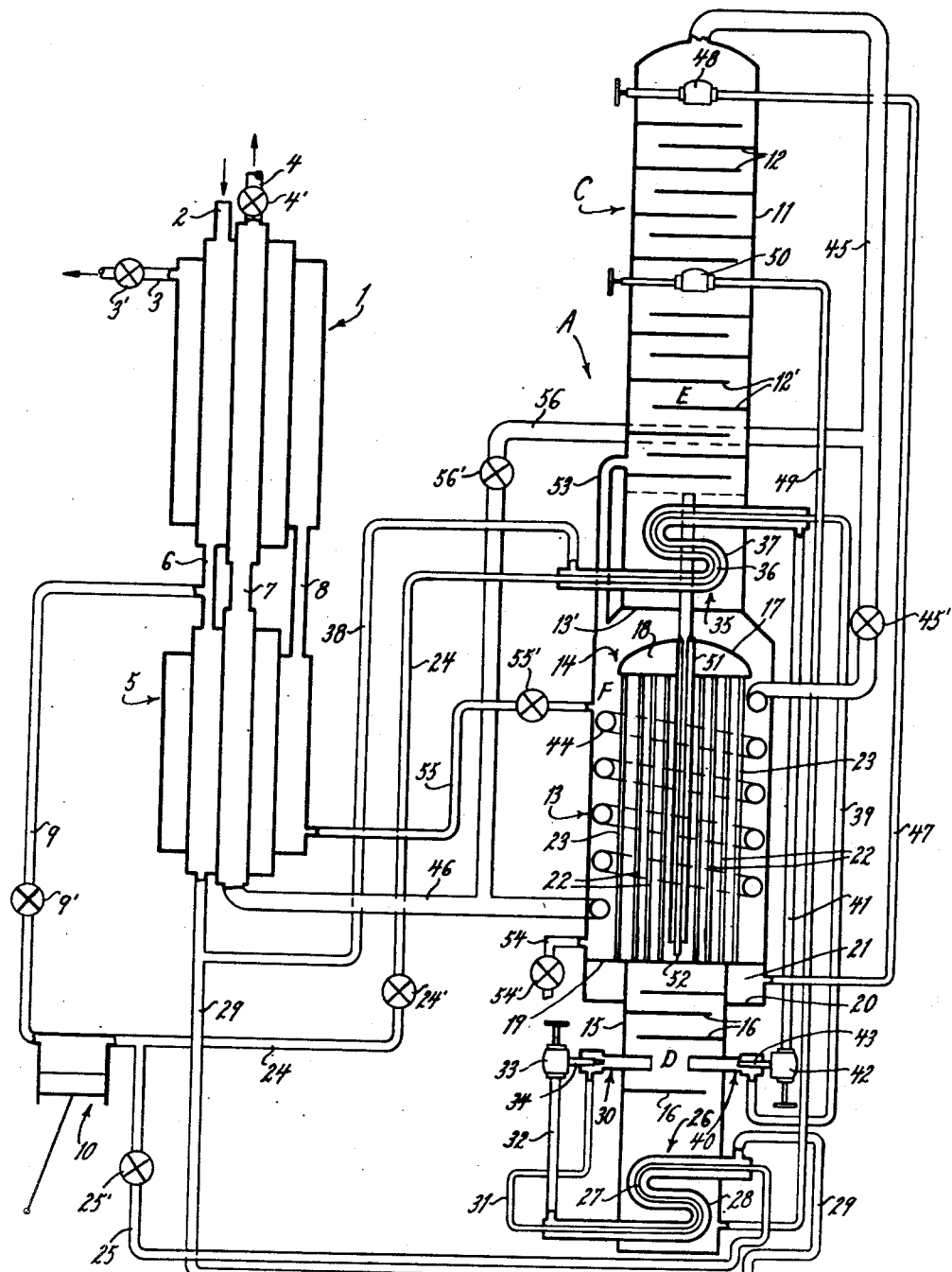
INVENTORS
ARTHUR J. FAUSEK
IRWING F. FAUSEK
BY *Em Harrington*
ATTORNEY Patented July 14, 1953

2,645,103

UNITED STATES PATENT OFFICE 2,645,103

APPARATUS FOR SEPARATING THE CONSTITUENTS OF GASEOUS MIXTURES

Arthur J. Fausek and Irwing F. Fausek, Clayton, Mo.

Application May 2, 1949, Serial No. 90,808

3 Claims. (Cl. 62—123)

This invention relates generally to apparatus for separating a gaseous medium into its constituents and more specifically to such an apparatus which is adapted for use in separating air into its principal component parts, that is oxygen and nitrogen, the predominant object of the invention being to provide an apparatus of the type referred to which includes a rectifying column wherein the necessary functions required in the separation of air into the principal components thereof are performed in such manner that each step in the operation may be adjusted for complete control, and wherein the oxygen is cooled well below its vaporizing temperature so that said oxygen may be collected in suitable containers, or pumped with the aid of a liquid pump, with facility and without loss.

The single view of the drawing illustrates diagrammatically the apparatus of the present invention.

In the drawing, wherein is shown for purposes of illustration, merely, one embodiment of the invention, A designates generally the apparatus of the present invention. The apparatus A includes a heat interchanger 1 which is provided with an inlet conductor 2 by which high pressure air is delivered to said heat interchanger from a source of said high pressure air. The heat interchanger 1 is provided also with an outlet conductor 3 for conducting oxygen from the apparatus A, and an outlet conductor 4 for conducting nitrogen from said heat interchanger, said conductors 3 and 4 being provided, respectively, with valves 3' and 4'. The apparatus A includes also a liquefier 5, and a conductor 6 conducts high pressure air from the heat interchanger 1 to said liquefier. Additionally, the liquefier 5 is provided with a conductor 7 which conducts outgoing nitrogen from said liquefier to the heat interchanger 1, and with a conductor 8 which conducts outgoing oxygen from said liquefier to said heat interchanger. The conductor 6 has connected thereunto a conductor 9 having a valve 9', said conductor 9 leading to an expansion engine 10 and serving to conduct high pressure air from the heat interchanger 1 to said expansion engine.

The apparatus A of the present invention includes a rectifying column C which is provided with an upper section 11 wherein is disposed groups of conventional rectifying trays 12 and 12', said column C having an intermediate section 13 in which is disposed a condenser structure 14, and a lower section 15 which has located in the upper portion thereof a group of rectifying trays 16, the sections 11 and 13 being separated by a wall 13'. The condenser structure 14 includes a head 17 which is hollow so as to provide a compartment 18 therein. At its lower end the condenser structure 14 is provided with a bottom wall 19 which is suitably secured to the wall of the intermediate section 13 of the column C, said bottom wall of the condenser structure 14 being spaced upwardly from the bottom wall 20 of the intermediate section 13 of the column so as to provide a chamber 21 between said bottom walls 19 and 20. Also, the top edge of the wall of the lower section 15 of the column C contacts with the lower face of the bottom wall of the condenser structure 14 whereby the chamber 21 is of annular shape. The condenser structure 14 includes a plurality of vertical tubes 22 which communicate at their upper ends with the compartment 18 of the head 17 of said condenser structure, and at their lower ends with the upper portion of the lower section 15 of the column C. Additionally, the condenser structure 14 includes an outer row of tubes 23 which communicate at their upper ends with the compartment 18 of the head 17 of the condenser structure and at their lower ends with the chamber 21.

Leading from the expansion engine 10 is a conductor 24 into which is connected a conductor 25 having a valve 25', said conductor 25 leading to a boiling coil 26 which is disposed within the lower section 15 of the column C. The boiling coil 26, as it is illustrated in the drawing, comprises an inner conductor 27 of substantially S-shaped formation into which the conductor 25 is connected so that expanded air is delivered by the expansion engine to said inner conductor of the boiling coil 26. Also, the boiling coil 26 includes an outer S-shaped conductor 28 which is of larger diameter than the inner conductor 27 and through which said inner conductor extends, the relative diameters of the inner and outer conductors of the boiling coil 26 being such that a passageway is provided through the boiling coil between the walls of the inner and outer conductors thereof. The passageway within the outer conductor 28 of the boiling coil 26 is connected by a conductor 29 to the liquefier 5 so that high pressure air is conducted from said liquefier to said passageway during operation of the apparatus A. The inner conductor 27 of the boiling coil 26 is connected to a mixing T 30 by a conductor 31, and the outer conductor 28 of said boiling coil 26 is connected by a conductor 32 to a valve 33 that is provided with a nozzle 34 which projects into said mixing T 30 for an obvious purpose.

The apparatus A includes a second boiling coil 35 which is located therein at a point above the condenser 14. The boiling coil 35 comprises an inner substantially S-shaped conductor 36 and an outer substantially S-shaped conductor 37, the relative diameters of said inner and outer conductors of the boiling coil 35 being such that a passageway is provided between the walls of said inner and outer conductors which extends through the boiling coil. The inner conductor 36 of the boiling coil 35 is connected to the conductor 24 which is provided with a valve 24' and conducts expanded air to said inner conductor from the expansion engine 10, while the passageway through the boiling coil 35 within the outer conductor 37 thereof is connected by a conductor 38 to the conductor 29 which leads, also, to the passageway within the outer conductor of the boiling coil 26. The inner conductor 36 of the boiling coil 35 has connected thereto a conductor 39 which leads to a mixing T 40, which is similar to the mixing T 30 previously referred to herein, and the passageway within the outer conductor of the boiling coil 35 is connected by a conductor 41 to a valve 42, said valve 42 being provided with a nozzle 43 which is projected into the mixing T 40.

Disposed within the intermediate section 13 of the column C is a coil 44 which embraces the condenser structure 14, and leading to the upper portion of said coil from the top of the column is a nitrogen conductor 45 having a valve 45' interposed therein, the lower portion of said coil 44 being connected to the liquefier 5 by a conductor 46. Also, a conductor 47 leads from the chamber 21 to an expansion valve 48 disposed within the upper portion of the column C above the trays 12, while a conductor 49 leads from the lower portion of the column C to an expansion valve 50 which is disposed beneath the trays 12 and above the trays 12'.

The condenser structure includes a tubular element 51 which extends downwardly of said condenser structure from the top wall of the head 17 thereof. This tubular element has extended therethrough a tube 52 whose upper portion is of increased diameter and which extends upwardly into the lower portion of the upper section 11 of the column C. Also, the upper section 11 and the intermediate section 13 of the column C are connected by a conductor 53 so as to equalize the pressure in said column sections, and a conductor 54 having a valve 54' is provided for drawing liquid oxygen from the intermediate section of the column and conducting it to containers. Also, a conductor 55 is provided for conducting oxygen from the column section 13 to the liquefier 5, said conductor 55 having a valve 55'.

It is to be noted that in effect the column C of the apparatus A of the present invention is divided into a plurality of separate compartments which are connected through conductors so as to enable each compartment to perform a certain operation before its contents pass to another compartment, and in the operation of the apparatus, streams of high pressure air leaving the liquefier 5 and expanded air leaving expansion engine 10 are conducted separately through the boiling coils 26 and 35 in each of which boiling coils the streams of air from the liquefier and from the expansion engine are in heat exchange relation with respect to each other. From the boiling coils 26 and 35 such streams of air flow to compartment D, said air being discharged into said compartment D from the mixing T's 30 and 40 and being controlled by the valves 33 and 42. Liquid collecting in compartment D is conducted by conductor 49 to expansion valve 50 from which said liquid flows downwardly over the rectifying trays 12' to the lower portion of compartment E.

Vapors rising in compartment D move upwardly through the tubes 22 of the condenser structure to compartment 18 within the head 17 of the condenser structure, during which operation oxygen is condensed and returns to compartment D. The gas which reaches compartment 18 within the head 17 of the condenser structure is pure, or substantially pure, nitrogen and such nitrogen moves downwardly through the outer tubes 23 to chamber 21 where it collects as a liquid, or partially liquid and partially vapor. This nitrogen then flows through conductor 47 to expansion valve 48 in the top portion of the column from which it is discharged for downward movement over the rectifying trays 12 and 12', the liquid oxygen portion flowing to the lower portion of compartment E. When the level of this liquid rises above the top of the tube 52 it overflows into the compartment F from which it may be withdrawn through the valved conductor 54 to the heat exchanger 1, or through the valved conductor 55 to liquid containers.

Nitrogen ensuing from the top of the column C through conductor 45 is conducted through the coil 44, and since this nitrogen can be as much or more than 12° centigrade colder than the liquid oxygen in compartment F, the liquid oxygen in this compartment becomes colder than its normal temperature of approximately minus 183° centigrade. Such lowering of the temperature of the oxygen stabilizes it as a liquid and facilitates introducing it into containers, or pumping the liquid oxygen with the aid of a liquid pump. It is to be noted that boiling coil 35 may be adjusted for temperature, or the extent of its boiling effect, by adjustment of valve 42, the purpose of this being to replace boiling effect of the condenser in a manner that can be controlled. The conductor 56, which is provided with a valve 56', connects the nitrogen conductor 45 with the nitrogen conductor leading from the coil 44 and provides means for by-passing nitrogen around said coil 44 when this is desired.

We claim:

1. An apparatus for separating air into its principal component parts comprising a rectification column which is divided into a plurality of separate compartments, a first boiling coil, a second boiling coil, said first and second boiling coils being disposed in different compartments of said column and each of said boiling coils being provided with separate passageways arranged one within the other and adapted for the passage therethrough of separate bodies of air which are in heat exchange relation with each other while passing through said boiling coil, and means for delivering said separate bodies of air to said boiling coils.

2. An apparatus for separating air into its principal component parts comprising a rectification column which is divided into a plurality of separate compartments, a first boiling coil, a second boiling coil, said first and second boiling coils being disposed in different compartments of said column and each of said boiling coils being provided with tortuously extended separate passageways arranged one within the other and adapted for the passage therethrough of separate bodies of air which are in heat exchange relation with each other while passing through said boiling coil, and means for delivering said separate bodies of air to said boiling coils.

3. An apparatus for separating air into its principal component parts comprising a rectification column which is divided into a lower compartment, an intermediate compartment, and an upper compartment, a condenser disposed in said intermediate compartment, a first boiling coil disposed at a point above said condenser in said upper compartment, a second boiling coil disposed at a point below said condenser in said lower compartment, each of said boiling coils being provided with separated passageways adapted for passage therethrough of separate bodies of air which are in heat exchange relation with each other while passing through the boiling coil, means for delivering said separate bodies of air to said boiling coils, a conductor disposed adjacent to said condenser, and conducting means for conducting cold nitrogen from the top of said column to said conductor adjacent to said condenser.

ARTHUR J. FAUSEK.
IRWING F. FAUSEK.

References Cited in the file of this patent

UNITED STATES PATENTS

| Number | Name | Date |
|---|---|---|
| 1,513,116 | Lafferty | Oct. 28, 1924 |
| 1,537,193 | Roberts et al. | May 12, 1925 |
| 1,594,336 | Mewes et al. | July 27, 1926 |
| 1,885,059 | Cicali | Oct. 25, 1932 |
| 2,180,435 | Schlitt | Nov. 21, 1939 |